Feb. 13, 1934.    A. A. PONSONBY    1,947,059
MOTOR CONTROL SYSTEM
Filed Sept. 1, 1931
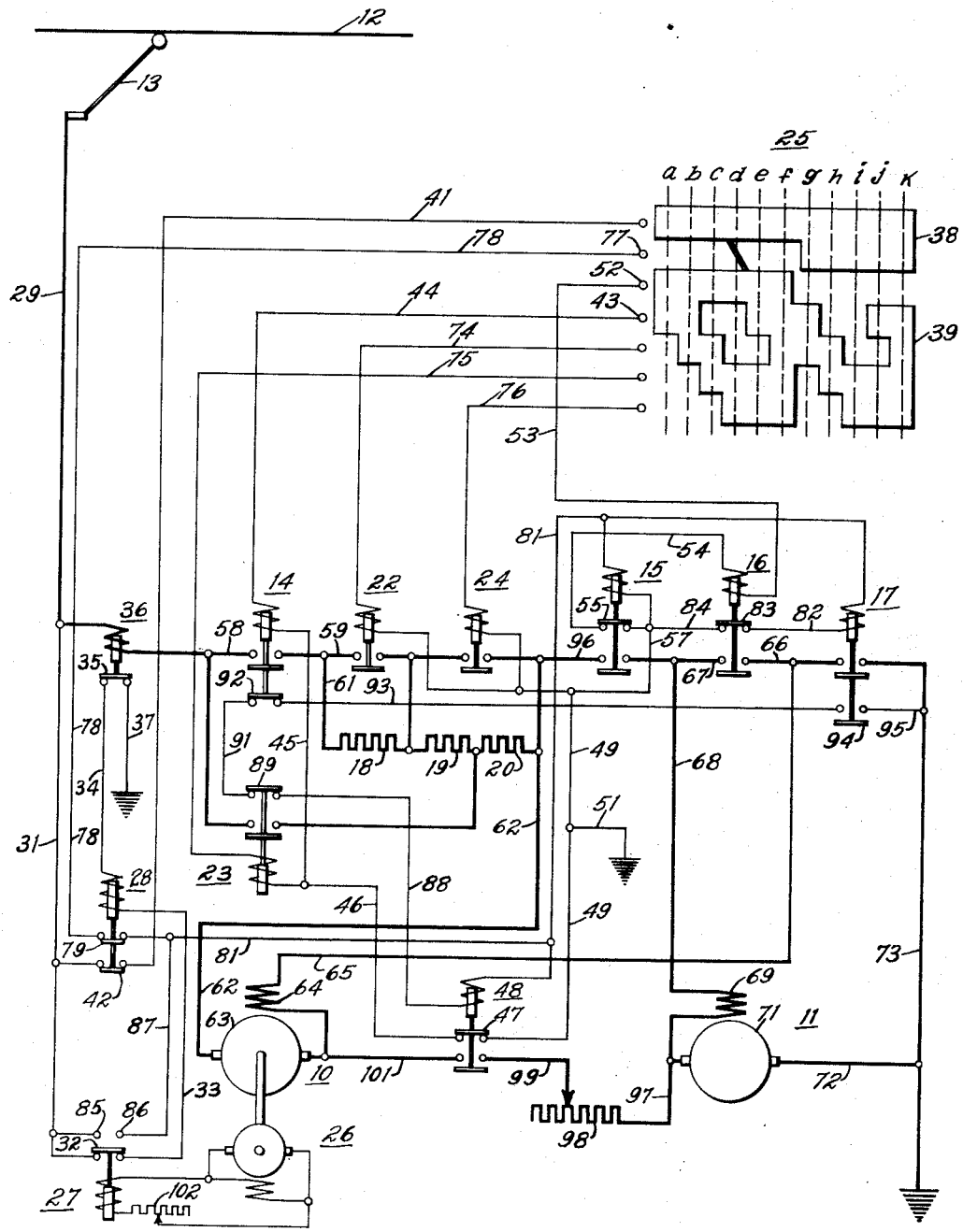
WITNESSES:
R. S. Williams
N. S. Chilcott
INVENTOR
Amos A. Ponsonby.
BY
W. R. Coley
ATTORNEY Patented Feb. 13, 1934

1,947,059

UNITED STATES PATENT OFFICE 1,947,059

MOTOR CONTROL SYSTEM

Amos A. Ponsonby, Wilkinsburg, Pa., assignor to Westinghouse Electric & Manufacturing Company, a corporation of Pennsylvania Application September 1, 1931. Serial No. 560,561

5 Claims. (Cl. 172—179)

My invention relates, generally to motor control systems and, more particularly, to systems for controlling the operation of the propelling motors of electric vehicles.

In the operation of electric vehicles, and particularly, electric locomotives of the mining or industrial type, it is desirable to limit the speed of the locomotive to a pre-selected safe value.

Accordingly, an object of my invention, generally stated, is to provide for automatically limiting the speed of an electrically-propelled vehicle to a predetermined value.

A more specific object of my invention is to automatically apply electrical braking to the propelling motors of an electric locomotive when it exceeds a predetermined speed.

Other objects of my invention will be apparent to those skilled in the art or will be explained fully hereinafter.

In accordance with my invention, a relay, which is responsive to the speed of a locomotive, is utilized to so govern the operation of the control apparatus of the locomotive that the propelling motors are disconnected from the power source and dynamic braking is automatically applied to the motors when the speed of the locomotive exceeds a predetermined value. When the speed of the locomotive is reduced to the desired value the dynamic braking circuits are interrupted and power is automatically reapplied to the motors, according to the position of the master controller, which normally controls the operation of the motors.

For a fuller understanding of the nature and scope of my invention, reference may be had to the following detailed description, taken in connection with the accompanying drawing, the single figure of which is a diagrammatic view of a control system organized in accordance with my invention.

Referring to the drawing, the system shown comprises motors 10 and 11, which may be of any type suitable for propelling an electric vehicle (not shown). Power for operating the motors may be transmitted to the vehicle from any suitable power source (not shown) by means of a trolley conductor 12 and a current collector 13, which is mounted upon the vehicle in a well-known manner.

In accordance with the usual practice in controlling electric locomotives, a plurality of electrically-operated switches 14, 15, 16 and 17 are provided for connecting the motors 10 and 11 to the power source. As is the usual practice, these switches are so disposed that the motors 10 and 11 may be connected in either series or parallel-circuit relation, thereby controlling the speed of the vehicle.

In order to suitably regulate the vehicle speed, a plurality of resistors 18, 19 and 20 may be connected in the motor circuits to limit the current supplied to the motors. The usual electrically-operated switches 22, 23 and 24 are provided for shunting the resistors in a predetermined sequence in order to accelerate the motors 10 and 11. A master controller 25, which may be of the well-known drum type, is provided for controlling the operation of the motor-connecting switches and also the accelerating switches.

With a view to preventing the locomotive from being operated above a predetermined speed, a pilot generator 26, a speed-responsive relay 27 and a voltage relay 28 are provided for controlling the motor-connecting switches to automatically disconnect the motors from the power source and apply dynamic braking to the motors when the vehicle attains a predetermined speed. The pilot generator 26 is driven by the motor 10 to generate a voltage proportional to the speed of the vehicle and, as shown, the actuating coil of the relay 27 is connected across the terminals of the generator 26. In this manner, a voltage is impressed upon the relay 27 which is directly proportional to the speed of the locomotive, the relay 27 thereby being responsive to the locomotive speed. As will be described in detail hereinafter, the relays 27 and 28 are utilized to limit the speed at which the vehicle may be operated, by automatically applying dynamic braking to the motors 10 and 11.

In order that the functioning of the foregoing apparatus may be understood, the operation of the control system shown in the preferred embodiment of my invention will now be described in detail.

It will be observed that the actuating coil of the relay 28 is normally connected across the power source, thereby energizing the coil and actuating the relay to its uppermost position. The circuit through the actuating coil may be traced from the power conductor 29 through conductor 31, a normally-closed contact member 32 of the relay 27, conductor 33, the coil of the relay 28, conductor 34 and a normally-closed contact member 35 of an overload relay 36 to a grounded conductor 37.

Accordingly, when the relay 28 is actuated to its uppermost position, the contact segments 38 and 39 of the master controller 25 are energized through a conductor 41 which is connected to the energized conductor 31 by means of a contact member 42 on the relay 28.

Assuming that it is desired to apply power to the motors 10 and 11 to operate the locomotive, the master controller 25 may be actuated to position "a", thereby energizing the actuating coils of the switches 14 and 16 to cause the motors 10 and 11 to be connected to the power source in series-circuit relation with the accelerating resistors. The energizing circuit for the switch 14 may be traced from a contact finger 43, which engages the energized contact segment 39 of the controller 25, through conductor 44, the actuating coil of the switch 14, conductors 45 and 46, an interlock 47 on a switch 48 and conductor 49 to a grounded conductor 51. The energizing circuit for the actuating coil of the switch 16 extends from a contact finger 52, which engages the energized contact segment 39, through conductor 53, the actuating coil of the switch 16, conductor 54, an interlock 55 on the switch 15, and conductors 57 and 49 to the grounded conductor 51.

The motors 10 and 11 are thereby connected in series-circuit relation and are also connected to the power source through the resistors 18, 19 and 20. The motor circuit may be traced from the power conductor 29, through the actuating coil of the overload relay 36, conductor 58, upper contact members of switch 14, conductors 59 and 61, the resistors 18, 19 and 20, conductor 62, the armature winding 63 and the field winding 64 of the motor 10, conductors 65 and 66, lower contact members of switch 16, conductors 67 and 68, the field winding 69 and the armature winding 71 of the motor 11, and conductor 72 to the grounded conductor 73.

The resistors 18, 19 and 20 may be shunted from the motor circuit to accelerate the motors in a manner well known in the art by actuating the controller 25, step-by-step, through positions "b" to "f", inclusive, thereby energizing the conductors 74, 75 and 76 to actuate the switches 22, 23 and 24, respectively, in a predetermined sequence. Since this manner of operating accelerating switches to accelerate the propelling motors of electric vehicles is well known in the art it is believed to be unnecessary to describe the operation of the switches in detail.

It will be noted that, as the controller 25 is actuated from position "f" to position "g", the actuating coil of the switch 16 is deenergized and the actuating coils of the switches 15 and 17 are energized, thereby transposing the motors 10 and 11 from series to parallel-circuit relation in a manner also well known in the art. The energizing circuit for the actuating coil of the switch 15 may be traced from a contact finger 77, which engages the contact segment 38, through conductor 78, contact member 79 on the relay 28, conductor 81, the coil of the relay 15, and conductors 57 and 49 to the grounded conductor 51. The circuit for the actuating coil of the switch 17 extends from the previously energized conductor 81, through the coil of the switch 17, conductor 82, an interlock 83 on the switch 16, and conductors 84, 57 and 49 to the grounded conductor 51.

In this manner, the voltage applied to the motors 10 and 11 may be increased to accelerate the motors. As is the usual practice, the resistors 18, 19 and 20 are again connected in the motor circuits when the motors are first connected in parallel-circuit relation. If it is desired to still further increase the speed of the motors, the resistors may be shunted from the motor circuit in sequential relation by actuating the controller 25 step-by-step, from position "g" to position "k", in accordance with familiar practice.

As previously stated, it is desirable to limit the speed at which electric vehicles of certain types, particularly mining locomotives, may be operated. According to my invention the operation of the master controller 25 is rendered ineffective when the locomotive attains a predetermined speed, the propelling motors are disconnected from the power source and dynamic braking connections for the motors are automatically established, thereby causing the speed of the locomotive to be reduced. When the speed of the locomotive is reduced to a predetermined value the normal operating connections for the motors are automatically restored and power is reapplied to the motors in accordance with the position to which the master controller 25 has been previously actuated by the operator.

As explained hereinbefore, the auxiliary generator 26 generates a voltage proportional to the speed of the locomotive and the relay 27, the actuating coil of which is energized by the auxiliary generator 26, is, therefore, responsive to the speed of the locomotive.

Therefore, when the locomotive attains a predetermined speed, the relay 27 is actuated to its uppermost position, thereby interrupting the energizing circuit for the actuating coil of the relay 28, which permits the latter relay to drop to its lowermost position. When the contact members of the relay 28 are opened, the conductor 41 is deenergized, thereby deenergizing the contact segments 38 and 39 of the controller 25, which causes the motor connecting switches 14, 15, 16 and 17 to be opened to disconnect the motors from the power source.

It will be noted that, when the relay 27 is actuated to its uppermost position, the contact member 32 bridges the contact members 85 and 86, thereby energizing the conductor 81 through a conductor 87, which is connected to the energized conductor 31 by the relay 27.

When the conductor 81 is energized by means of the contact members of the relay 27 the switches 15, 17 and 48 are actuated to establish dynamic braking connections for the motors 10 and 11. The energizing circuits for the actuating coils of the switches 15 and 17 have been previously traced and therefore, will not be repeated. The circuit through the actuating coil of the switch 48 extends from the energized conductor 81, through the coil of the switch 48, conductor 88, an interlock 89 on the switch 23 which is in its lowermost position since the controller 25 is deenergized, conductor 91, an interlock 92 on the switch 14 which is also in its lowermost position, conductor 93, an interlock 94 on the switch 17 which is in its uppermost position, and conductor 95 to the grounded conductor 73.

When the switches 15, 17 and 48 are closed, the motors 10 and 11 are so interconnected that the direction of the flow of current through the armatures of the motors is reversed with respect to the current in the field windings of the motors, thereby causing the motors to act as generators to retard the movement of the locomotive by dynamic braking.

The dynamic braking circuit for the motor 10, which is established by the closing of the switches 15, 17 and 48, may be traced from one terminal of the armature 63 of the motor 10, through conductors 62 and 96, lower contact members of the switch 15, conductors 67 and 68, the field winding 69 of the motor 11, conductor 97, a resistor 98, conductor 99, lower contact members of the switch 48 and conductor 101 to the other terminal of the armature winding 63 of the motor 10.

The dynamic braking circuit for the motor 11 may be traced from one terminal of the armature winding 71, through conductor 97, the resistor 98, conductor 99, lower contact members of the switch 48, conductor 101, the field winding 64 of the motor 10, conductors 65 and 66, upper contact members of the switch 17, and conductors 73 and 72 to the other terminal of the armature 71 of the motor 11. It will be seen that in this manner the direction of the current flowing through the armature windings of the two motors is reversed, while the current in the field windings is in the same direction as when the motors were connected to the power source. The motors are thereby caused to act as generators, which are driven (in the same direction as when accelerating) by the momentum of the vehicle. As is well known, the speed of the vehicle may be retarded in this manner.

When the speed of the vehicle is reduced to a value which permits the relay 27 to drop to its lowermost position, the actuating coil of the relay 28 is again energized, and the motor-connecting switches 14, 15, 16 and 17, as well as the accelerating switches 22, 23 and 24 will be selectively actuated to their closed positions, in accordance with the position on which the master controller 25 has been previously set by the operator. In this manner, the motors 10 and 11 are reconnected to the power source and an amount of power, dependent upon the position of the master controller 25, is reapplied to the motors.

It will be observed that a variable resistor 102 is connected in series with the actuating coil of the relay 27 which is connected across the terminals of the auxiliary generator 26. Accordingly, the voltage impressed upon the coil of the relay 27 at a definite speed of the locomotive may be varied by adjusting the resistor 102. It will be understood, that the speed at which the relay 27 will be actuated to its uppermost position may be determined by adjusting the variable resistor 102, thereby setting the maximum speed at which the locomotive may be operated.

From the foregoing description, it will be evident that I have provided a control system which limits the speed at which an electric locomotive, or other vehicle, may be operated, by automatically disconnecting the propelling motors from the power source and establishing electrical braking connections for the motors. When the speed of the locomotive is reduced, by the dynamic braking action, to a predetermined rate, power is automatically reapplied to the motors. It is, therefore, impossible for the operator to cause the locomotive to be operated above a safe speed and it is also impossible for the locomotive to attain an unsafe speed when it is coasting down a grade with the motors disconnected from the power source as the dynamic braking connections for the motors are always automatically established when the locomotive exceeds a predetermined speed.

I do not desire to be restricted to the specific embodiment of my invention herein shown and described, since it is evident that it may be changed and modified without departing from the spirit and scope of my invention as defined in the appended claims.

I claim as my invention:

1. In a control system for an electric vehicle in combination, a plurality of propelling motors, a source of power for the motors, a plurality of switches for controlling the operation of the motors, a controller for normally controlling the switches to accelerate the motors, and means responsive to the speed of the vehicle for automatically actuating said switches to establish dynamic braking connections for the motors independently of the position of the controller to prevent the vehicle from being operated above a predetermined speed.

2. In a control system for an electric vehicle, in combination, a plurality of propelling motors, a source of power for the motors, switching means for connecting the motors to the power source to propel the vehicle, a manually-operable controller for normally actuating the switches, and means responsive to the speed of the vehicle for automatically disconnecting the motors from the power source and establishing dynamic braking connections for the motors independently of the position of the controller, whereby the operation of the controller is rendered ineffective and the vehicle is prevented from travelling above a predetermined speed.

3. In a control system for an electric vehicle in combination, a plurality of propelling motors, a source of power for the motors, a plurality of accelerating resistors for governing the voltage applied to the motors, a plurality of accelerating switches for shunting the resistors to control the speed of the vehicle, a manually-operable controller disposed to be actuated to predetermined positions to operate the accelerating switches to accelerate the vehicle, and control means responsive to the speed of the vehicle for disconnecting the motors from the power source and establishing dynamic braking connections for the motors independently of the position of the controller when the vehicle exceeds a predetermined speed, said control means being disposed to reapply a predetermined amount of power to the motors after the speed of the vehicle has been reduced a predetermined amount.

4. In a control system for an electric vehicle, in combination a plurality of motors for propelling the vehicle, a source of power for the motors, a plurality of switches for connecting the motors to the power source to operate the vehicle, a master controller disposed to be actuated to predetermined positions for normally controlling the operation of the motor connecting switches to regulate the speed of the vehicle, and a relay responsive to the speed of the vehicle for actuating said switches to disconnect the motors from the power source and establish dynamic braking connections for the motors independently of the position of the controller when the vehicle exceeds a predetermined speed, said relay being disposed to actuate said switches to reapply an amount of power to the motors dependent upon the position of the master controller when the speed of the vehicle falls below said predetermined speed.

5. In a control system for an electric vehicle, in combination, a plurality of motors for propelling the vehicle, a source of power for the motors, a plurality of switches for connecting the motors to the power source to operate the vehicle, a master controller disposed to be actuated to predetermined positions for normally controlling the operation of the motor connecting switches to regulate the speed of the vehicle, a relay responsive to the speed of the vehicle for actuating said switches to disconnect the motors from the power source and establish dynamic braking connections for the motors independently of the position of the controller when the vehicle exceeds a predetermined speed, said relay being disposed to actuate said switches to reapply an amount of power to the motors dependent upon the position of the master controller when the vehicle falls below a predetermined speed, and means for adjusting said relay to vary the speed at which dynamic braking will be applied to the motors.

AMOS A. PONSONBY.